(12) United States Patent
Bickers

(10) Patent No.: US 6,268,975 B1
(45) Date of Patent: Jul. 31, 2001

(54) TAPE DRIVE UTILIZING ENCODED FILE MARKERS TO LOCATE TARGET POSITIONS

(75) Inventor: Richard Arthur Bickers, Bristol (GB)

(73) Assignee: Hewlwtt-Packard Company, Palo Alto, CA (US)

( * ) Notice: Subject to any disclaimer, the term of this patent is extended or adjusted under 35 U.S.C. 154(b) by 0 days.

(21) Appl. No.: 09/266,926

(22) Filed: Mar. 12, 1999

(30) Foreign Application Priority Data

Mar. 13, 1998 (GB) .................................................. 9805367

(51) Int. Cl.[7] .............................. G11B 15/18; G11B 17/00
(52) U.S. Cl. .................... 360/72.2; 360/72.1; 360/77.07; 360/77.06; 360/49; 360/70; 360/50
(58) Field of Search .................... 360/48, 49, 50, 360/58, 69, 70, 71, 72.1, 72.2, 77.04, 77.06, 77.07, 78.14, 83, 134

(56) References Cited

U.S. PATENT DOCUMENTS

| | | | |
|---|---|---|---|
| 3,852,814 | * 12/1974 | Johnson et al. | 360/72.1 |
| 4,691,250 | * 9/1987 | Ookawa | 386/57 |
| 4,947,367 | * 8/1990 | Chang et al. | 710/65 |
| 5,163,136 | 11/1992 | Richmond . | |
| 5,319,503 | * 6/1994 | Hasegawa et al. | 360/48 |
| 5,335,122 | * 8/1994 | An | 360/70 |
| 5,394,280 | * 2/1995 | Chliwnyj et al. | 360/77.12 |
| 5,566,032 | 10/1996 | Cleveland et al. . | |
| 6,118,605 | * 9/2000 | Call et al. | 360/50 |

FOREIGN PATENT DOCUMENTS

| | | |
|---|---|---|
| 0482297 A2 | 4/1992 | (EP) . |
| WO 93/0551 | 3/1993 | (WO) . |

* cited by examiner

Primary Examiner—B. James Peikari
(74) Attorney, Agent, or Firm—Lowe Hauptman Gilman & Berner, LLP

(57) ABSTRACT

The present invention provides methods and apparatus for locating target positions within an encoded data stream, where the encoded data stream incorporates special, reserved codewords to represent host data structure information, such as file marks and record boundaries. The encoded data stream can also only be read or decoded in the forwards direction. Incorporation of the special codewords obviates an index associated with the encoded data to support navigation within the encoded data stream. The methods and apparatus locate target positions by decoding the data until the target position is encountered, and provide mechanisms to enable location of target positions that are specified as being backwards, relative to a current position in the encoded data stream.

12 Claims, 4 Drawing Sheets

TAPE DRIVE UTILIZING ENCODED FILE MARKERS TO LOCATE TARGET POSITIONS

TECHNICAL FIELD

The present invention relates to data storage and in particular to methods and apparatus for locating target positions in stored data.

BACKGROUND ART

It is well known for data storage apparatus, such as a tape drive, to compress incoming data prior to storing the data to a backup medium, such as tape. An example of such a tape drive is one conforming to the DDS (Digital Date Storage) format, defined in ISO/IEC Standard 10777:1991 E. As described in detail in EP 0 464 190, a DDS tape drive encodes received data records, by compressing the data records using a codeword based algorithm, and stores the compressed data codewords into fixed length groups.

One characteristic of a codeword based compression algorithm is that data can only be decompressed if decompression begins from exactly the same position in an encoded data stream as where the compression began. The position in the data stream where both compression and decompression must begin is sometimes called an access point. Codeword algorithms of this type include the well-known LZ (Lempel-Ziv) algorithms, which will not be described in detail herein. Although not considered herein, an encoded data stream might comprise encrypted data rather than compressed data. However, the same requirements for an access point apply.

Prior to compressing the data, a DDS drive strips out all host data structure information, such as file mark and set mark information, received from the host computer system. The effect of this is that the compressed data stream in a group only contains host data.

Typically, hosts can issue commands to a tape drive to 'space' to, or 'locate', different positions in the encoded data stream. Such an operation is conveniently supported in a DDS drive by the provision of index information for each group, in the form of a block access table (BAT). The BAT of includes a series of entries, each one corresponding to a respective record, file mark or set mark in the group. Each entry corresponding to a record includes the length in bytes of the respective compressed record data in the group. In effect, the BAT contains a logical map of the data in the group, which provides a derivable byte position of any record boundary, file mark or set mark within the group. Therefore, a DDS tape drive can move to any valid logical target position within the encoded data stream simply by using the BAT to calculate the byte position of the target and decoding from the access point to that byte position.

In the co-pending, commonly assigned U.S. patent application Ser. No. 09/182,308 (filed on Oct. 30, 1998), entitled Data Encoding Method and Apparatus, the contents of which are hereby incorporated herein by reference, there is proposed a novel data encoding scheme suitable for tape drives. In the scheme, the requirement to have a BAT, or equivalent, is removed by embedding special codewords representative of host data structure information into the encoded data stream itself. In particular, special codewords are reserved to represent file marks and ends of records in an encoded data stream. The removal of the need for a BAT enables the encoding pipeline of a tape drive implementing the new scheme to operate at far higher data rates, since there is no requirement to generate and update a BAT.

The novel data encoding scheme, in common with DDS drives, implements a codeword-based compression algorithm, which allows data to be read only in the forward direction starting from an access point.

The lack of a BAT in the applicant's new scheme, however, presents a problem as far as moving to target positions is concerned. The lack of a BAT means it is not possible to predetermine the byte position of a target in a stream of encoded data. This is particularly problematic when a target position is specified as being upstream (or backwards) in the encoded data stream.

DISCLOSURE OF THE INVENTION

The present invention is aimed at providing a convenient solution to the problem of moving backwards, or in upstream direction, to a target position within encoded data, where the data can only be read in the forwards, or downstream, direction from an access point.

Accordingly, the present invention provides a method of controlling data storage apparatus to locate a target position upstream of a current position within an encoded data stream, the encoded data stream being readable only in the downstream direction from an access point and comprising a sequence of codewords including data codewords representing encoded blocks of user data and structure codewords representing the logical partitioning of the blocks of user data within the encoded data stream, wherein the target position is a number of structure codewords upstream from the current position and at, or a number of structure codewords downstream from, the access point the method including the steps of:

from the current position, moving to the access point upstream of the target position;

from the access point, decoding the encoded data in the downstream direction until the structure codeword at the target position is encountered or until an unexpected structure codeword is encountered; and arranging the apparatus to re-encounter said structure codeword first in any subsequent data read operation.

In accordance with a second aspect, the present invention provides tape drive apparatus comprising:

an interface arranged to receive a host command to locate a target position within an encoded data stream;

a data store arranged to store at least some of the encoded data stream, the encoded data stream being readable only in a downstream direction from an access point which is upstream of the target position and comprising a sequence of codewords including data codewords representing encoded blocks of user data and structure codewords representing the logical partitioning of the blocks of user data within the encoded data stream; and a decoder arranged to locate the access point and decode the stored data in the main memory downstream from the access point until the target position is encountered or until an unexpected structure codeword is encountered, the decoder also being arranged to re-encounter said structure codeword first in any subsequent data read operation.

BRIEF DESCRIPTION OF THE DRAWINGS

For a better understanding of the invention and to show how the same may be carried into effect, there will now be described, by way of example only, specific embodiments, methods and processes according to the present invention with reference to the accompanying drawings in which.

BEST MODE FOR CARRYING OUT THE INVENTION, & INDUSTRIAL APPLICABILITY

There will now be described by way of example the best mode contemplated by the inventors for carrying out the invention. In the following description numerous specific details are set forth in order to provide a thorough understanding of the present invention. It will be apparent however, to one skilled in the art, that the present invention may be practised without using these specific details. Also, well-known methods and structures have not been described in detail so as not to unnecessarily obscure the present invention.

By way of background, common tape drive standards dictate that hose apparatus may instruct a tape drive to move, or 'space', to a target position relative to a current position or an absolute position. When a space relative to the current position is required, the direction is also specified. However, when a space is relative to an absolute position, it is necessary to determine whether the target is upstream or downstream of the current position. Typically, a tape drive will keep track of its current position in the data stream and will very simply be able to determine whether an absolute space will be forwards or backwards relative to the current position.

In the absence of a read command from the host, a space operation does not require the tape drive to return any stored host data to the host computer. Further, although a space is typically followed by a read data command, multiple space commands can be issued before any other read or write command is issued.

Figure 1:
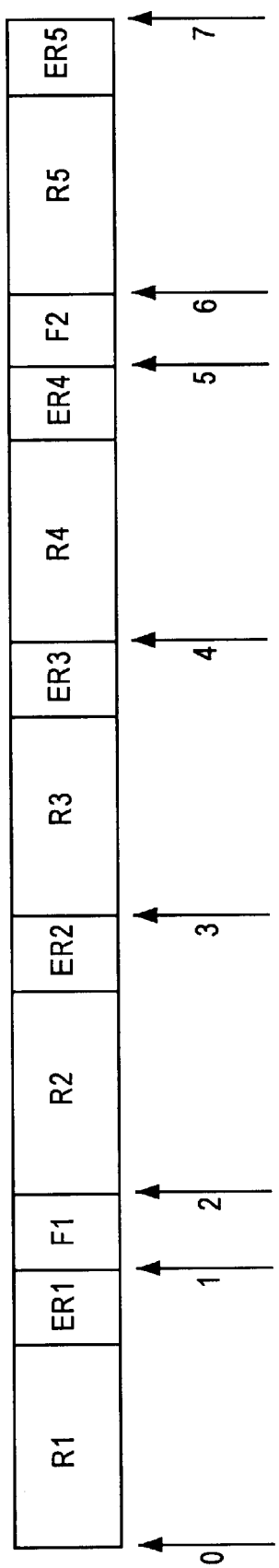
FIG. 1 is a diagram which represents an exemplary encoded data stream, used to assist with a better understanding of the operation of the present embodiment.

There are typically a number of ways in which a host requires a tape drive to space around stored data, for example:

1. a number of records forwards or backwards
2. a number of file marks forwards or backwards
3. to an absolute file mark and record position
4. to an absolute record position ignoring file marks
5. to an absolute block position treating both file marks and records as blocks—i.e. the target is the file mark and record counts added together FIG. 1 shows an exemplary encoded data stream comprising encoded data records (R1–R5) and file mark codewords (F1–F2), where each absolute position that can be spaced to is indicated by a numbered arrow (1–7). Further, each record is shown terminated by an end of record codeword (ER1–ER5). Specifically, the data stream shown consists of the sequence—one record, a file mark, three records, a file mark and finally a record. The data records are not necessarily the same length, even thought they are illustrated as being so. This exemplary data stream will be used in all the following examples to illustrate how spacing through the data may be achieved. Throughout this description, the forwards direction, or downstream direction, is defined as moving from left to right in the data stream, the backwards direction, or upstream direction, is defined as being from right to left and data is written and read in the forwards direction.

For space commands there is a defined hierarchy between file marks and records, with file marks taking priority: spacing a number of file marks can be performed without regard to records whereas spacing a number of records can 'encounter' a file mark, at which point the space is terminated as being unachievable, leaving the new position on the 'other side' of the file mark. Of course, the meaning of 'other side' depends on whether the requested space was forwards of backwards; if forwards, the 'other side' is to the right of the file mark, if backwards, the 'other side' is to the left of the file mark.

Encountering an unexpected file mark is defined as an error condition, since the space command is not achievable, and accordingly the tape drive is arranged to signal the host computer that an error has occurred.

In FIG. 1, for convenience, records and file marks are counted from absolute position 0, and the first record and file mark have the number 1. Using this representation, absolute position 4 is 1 file mark and 3 records from the beginning (abbreviated to 1F, 3R).

The following exemplary scenarios illustrate the differences between the various relative spacing requirements. Although the present invention particularly address backwards spacing, both forwards and backwards spacing examples are provided for the sake of completeness.

Current position 3 (1F, 2R), space forwards 2 records. Target position is (1F, 4R). The space is straight forward with no file marks being encountered during decoding, so the final position is 5 (1F, 4R).

Current position 3 (1F, 2R), space forward 3 records. Target position is (1F, 5R). In this case, the space encounters file mark 2 during decoding, so decoding terminates on 'the other side' of the file mark, at position 6, and an error signal is generated. The final position is therefore (2F, 4R).

Current position 3 (1F, 2R), space backwards 1 record. The target position is (1F, 1R). Since no unexpected file mark is encountered during decoding, the target is achievable and the final position is position 2 (1F, 1R).

Current position 3 (1F, 2R), space backwards 2 records. Target position is (1F, 0R). In this case an unexpected file mark is encountered. Thus, the target is unachievable, and the final position is on 'the other side' of the file mark, at position 1 (0F, 1R).

Current position 3 (1F, 2R), space forwards 1 file mark. Target position is abbreviated (2F, fwd). The records are ignored but the direction must be taken into account. The final position is on 'the other side' of the file mark at position 6 (2F, 4R).

Current position 7 (2F, 5R), space backwards 1 file mark. Target position is one file mark backward (abbreviated 1F, bwd), again using direction rather than a record target. The final position is on 'the other side' of the file mark, at position 5 (1F, 4R).

Absolute file mark and record spacing, relative to position 0, is treated like the target of a relative space. Consider these exemplary scenarios, again with reference to FIG. 1:

Absolute target (1F, 4R). Simply space to position 5.

Absolute target (1F, 5R). Not achievable, since it is like a target from a forward space that encountered a file mark. The final position is therefore position 6 (2F, 4R).

Absolute target (1F, 0R). Not achievable, since it is like a target from a backward space that encountered a file mark. The final position is therefore position 1 (0F, 1R).

Absolute record spacing is straight forward because the file marks can be ignored:

Absolute target (4R). Space to position 5 (1F, 4R).

Absolute target (5R). Space to position 7 (2F, 5R).

Absolute block spacing is also straight forward because by adding the file mark and record counts together the file mark/record hierarchy is eliminated:

Absolute target (4B). Space to position 4 (1F, 3R).

Absolute target (7B). Space to position 7 (2F, 5R).

Absolute target (0B). Remain at position 0 (0F, 0R).

It should be noted that in all of these examples, it is possible to have a target position that is beyond the boundaries of the data stream, for example (3F, 9R). This is also an error, but one that is dealt with by the tape drive at a higher level than within the space algorithm. These are errors such as the end of data (EOD) or beginning of tape (BOT) being encountered.

An exemplary architecture for a tape drive, suitable for supporting each of these modes of operation, will be described with reference to the diagram in FIG. 2.

Figure 2:
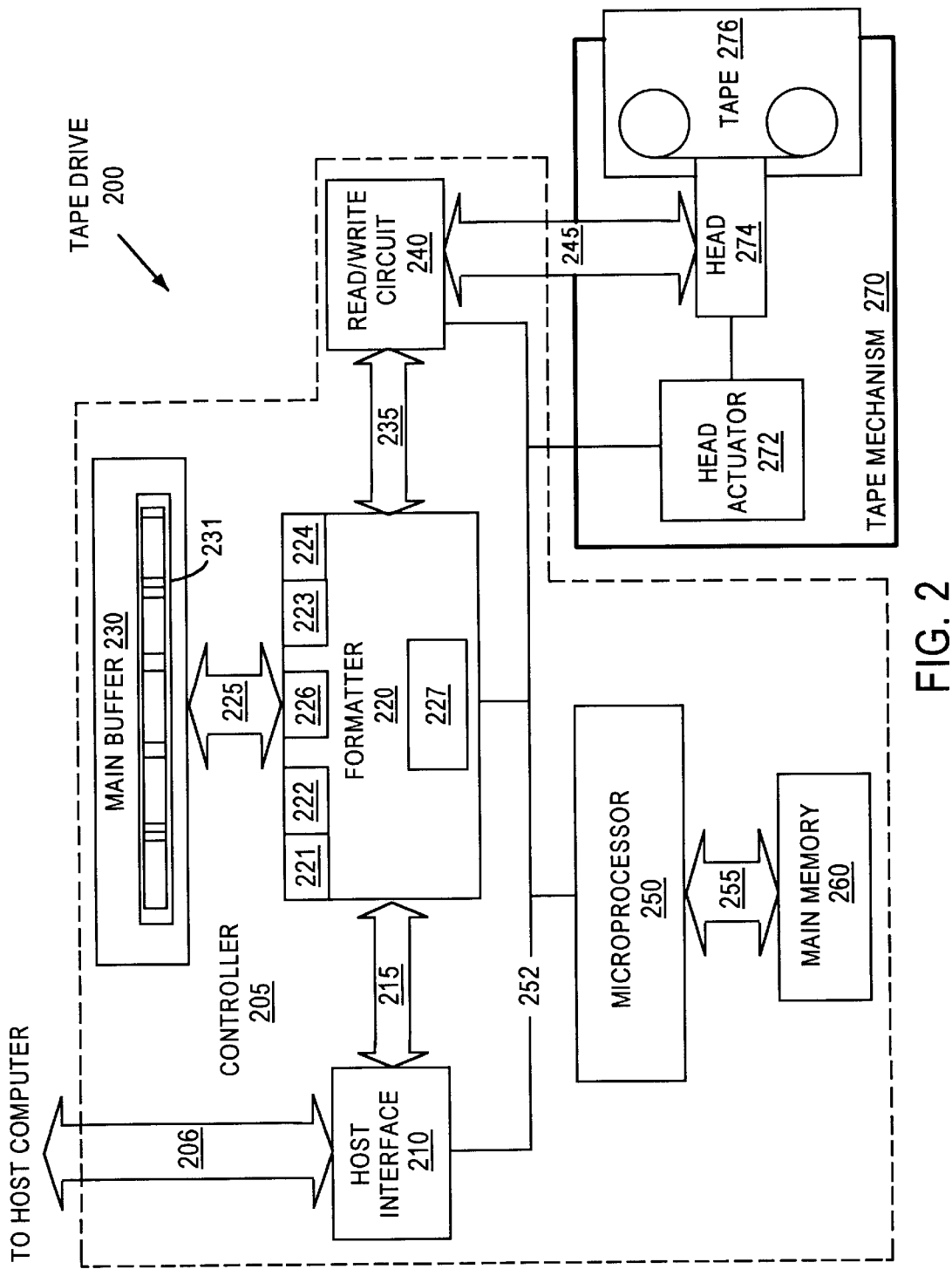
FIG. 2 is a block diagram which illustrates a tape drive suitable for operating in accordance with the present embodiment.

In FIG. 2, a tape drive 200 comprises a tape mechanism 270, and a controller 205.

Referring to FIG. 2, a host computer (not shown) is connected to the tape drive 200 via a SCSI (small computer system interface) bus 206. It is assumed herein that the host computer has loaded therein appropriate 'driver' software with which it can communicate in SCSI with the tape drive 200 and issue tape drive control commands.

In a 'write' operation, the tape drive 200 receives data to be backed-up to tape 276 from the host computer and in a 'read' operation the tape drive 200 sends data retrieved from tape 276 back to the host computer. For a space operation, the tape drive 200 receives a space command to space relative to a current position or to an absolute position, in the data stream.

The controller 205 comprises a series of ASICs (application specific integrated circuits) each programmed to carry out a specific data processing operation. The ASICs are: a host interface 210, for transferring commands and data between the host and the tape drive 200 across the SCSI bus 206; a formatter 220, connected to the host interface 210 by a first data bus 215, for encoding and decoding host data; and a read/write circuit 240, connected to the formatter 220 by a second data bus 235, for converting data into a form suitable for driving a write head or for reconverting signals from a read head into data. Also included is a main buffer 230, for storing therein data in a data set form, which is connected to the formatter 220 by a data bus 225. The main buffer comprises a block of DRAM, which is sufficient in size to hold at least one data set.

The controller 205 further comprises a microprocessor 250, for example a Motorola 68000 series microprocessor, and main memory 260 accessible by the microprocessor 250. The microprocessor 250 is controlled by firmware instructions stored in the main memory 260 to control all elements of the drive 205. The microprocessor 250 is connected to the other elements of the tape drive via a local bus 252 (including appropriate address, data and control lines) and controls the overall operation of each element of the tape drive.

The tape mechanism 270 includes: a read/write head 274 connected to the read/write circuit 240 by a third data bus 245; and a head actuator 233 for controlling the movement of the head 274. These elements are very well known in respect of DDS or linear data recording tape drives, and will not therefore be considered herein in more detail.

The tape drive 200 described herein is arranged to store and retrieve data in accordance with the data format, which is described in detail in the applicant's co-pending European patent application 97308756.2.

As defined by the format, encoded data is arranged into fixed length groups of data called data sets. A data set is 404,352 bytes long, of which 403,884 bytes are for encoded user data and the remaining bytes are reserved for information, such as: the data set identity; the numbers of records and file marks in the respective data set; the total number of file marks and records from the beginning of the tape including those held by the data set; and the location of an access point in the data set from where data decoding can begin. As shown in FIG. 2, a data set 231 is stored in the main buffer 230.

The formatter 220 has two file mark counters 221 and 222, which represent the current logical position in terms of number of file marks from the access point in the data set 230 and the number of file marks from the start of the data stream respectively. The formatter 220 also includes two record counters 223 and 224, which represent the current logical position in terms of the number of records from the access point in the data set 231 and the number of records from the start of the data stream respectively.

It will be appreciated that positions in the data stream defined by file mark and record counters are purely logical positions, since they do not provide any information that indicates, for example, how long any records are. As such, the counts do not give any indication of where the actual current position is in a data set 231 in the main buffer 230. Thus, the formatter 220 also includes a programmable pointer 226. The programmable pointer 226 points to the physical memory location of the current position in the main buffer 230, which represents the point in the buffer where the formatter 220 reads from, writes to or spaces from.

The present data format specifies that the encoded data stream is partitioned into fixed-length, length, 32-bit words. Of course, the length of a word may be different, for example 16-bits or 64-bits, in other embodiments. Further, both file mark codewords and end of record codewords are defined as 32-bit codewords, and the start of these codewords is always aligned with a word boundary in the encoded data stream (in practice, any space between the end of a record's data and the respective end of record codeword is padded with zeros to affect such alignment). When the formatter 220 decodes data, it determines whether a 32-bit word is a file mark codeword or an end of record codeword by reference to a lookup table 227 of codewords that are reserved for file marks, ends of records and the like. If the 32-bit word that is a file mark or an end of record codeword is written or encountered, the appropriate file mark and end of record counters are incremented.

When the current position and a requested target position are both within the data stored in the main buffer 230, decoding can be enacted purely on the basis of the data in the main buffer 230, otherwise the tape drive 200 needs to read the required data from tape into the main buffer 230 before the space operation can be completed.

The following description generally provides two examples of spacing from a current position to a target position upstream of the current position. In the examples, it is assumed that the data stream illustrated in FIG. 1 is the data set 231, which is stored in the main buffer 230, and that position 0 (0F, 0R) is the access point for the data set. It is also assumed that the space commands are valid and only cause the formatter 220 to move between points in the data set. Finally, for the sake of simplicity of description, only manipulation of the file mark counter 221 and the record counter 223 for the data set will be described. However, it should not be forgotten that the file mark counter 222 and the record counter 224 for the whole encoded data stream will be manipulated in the same manner.

Figure 3:
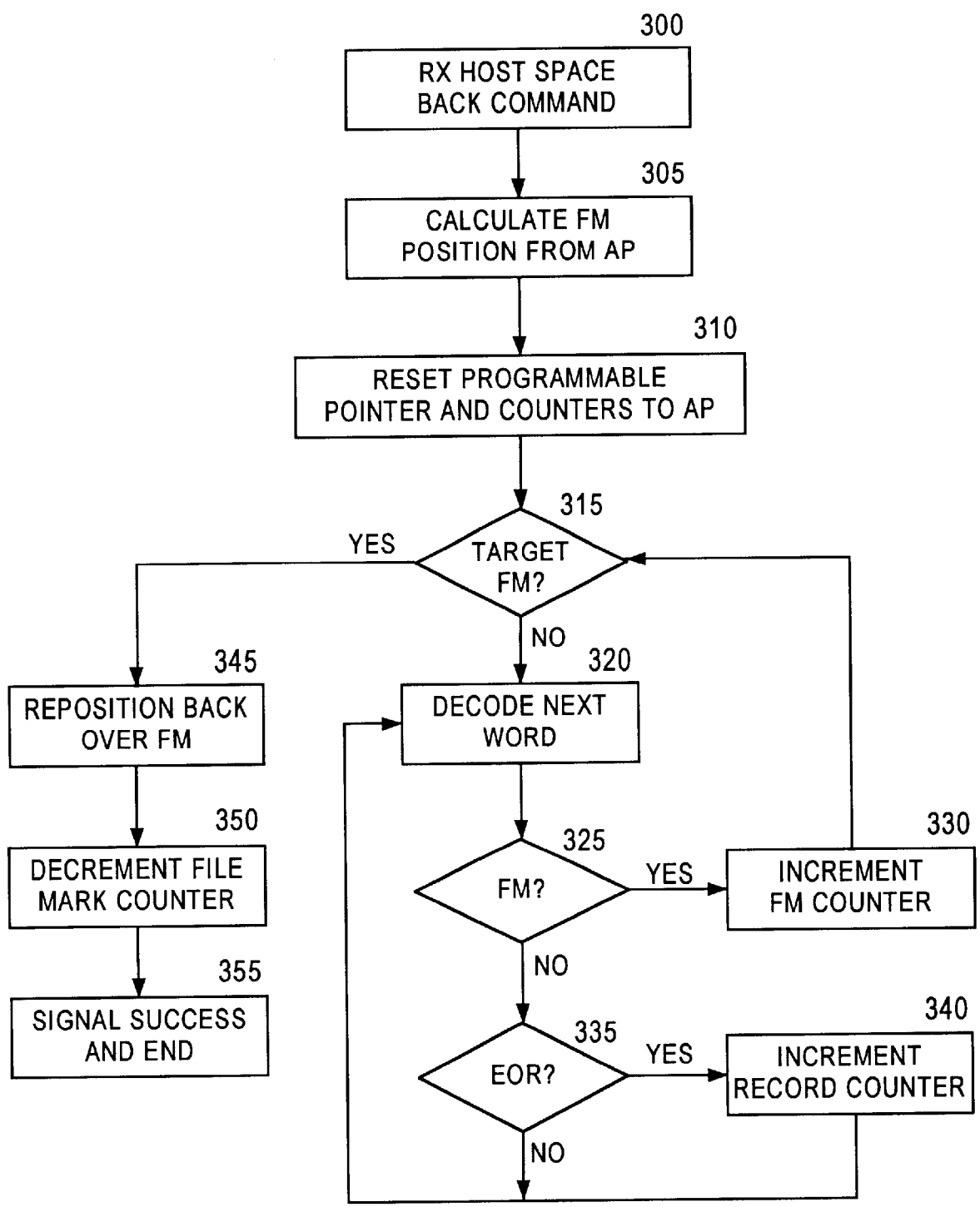
FIG. 3 is a flow diagram which illustrates an exemplary process for locating a target specified in terms of a number of file marks upstream of a current position in an encoded data stream.

FIG. 3 illustrates a process for moving backwards from a current position 7 (2F, 5R) by two file marks, which leaves the new current position as position 1 (0F, 1R).

In step 300, the tape drive 200 receives a host command to space backwards by two file marks. In step 305, the formatter 220 calculates the target position as a number of file marks downstream of the access point, by subtracting the number of file marks to space back by (i.e. 2) from the value in the file mark counter 221 (i.e. 2), and adds 1 (i.e. resulting in the value 1F). Clearly, this value is wrong, since the specified target value is 0F, but it is necessary to add 1 to achieve the required target position, since, at the access point, the file mark count for the data set 231 is already zero. In the general case of spacing backwards a certain number of file marks under the present data format, it is always the case that (in effect) initially 1 needs to be added to find the target value in order to achieve the correct target position. However, it is necessary to 'correct' the act of adding 1 later in the process.

In step 310, the formatter 220 sets the programmable pointer 226 and both the record and file mark counters to the respective values for the access point (which will be zero in this example). Then, in step 315, the formatter 220 determines whether the file mark counter at the access point equals the target file mark position. If it does not, in step 320, the formatter 220 decodes the first word (i.e. 32 bits in this example) in the main buffer 230 and updates the programmable pointer 226 accordingly. Then, in step 325, the formatter 220 determines whether the word is a file mark codeword, by reference to the lookup table 227. In step 330, if the word is a file mark codeword, the formatter 220 increments the file mark counter 223 and the process loops back to step 315 to test the file mark counter value against the target position again. Otherwise, in step 335, the formatter 220 determines whether the word is an end of record codeword. If not, the process loops back to step 320 to decode the next word. However, if the word is an end of record codeword, in step 340 the formatter increments the record counter 223 and then the process loops back to step 320 to decode the next codeword.

If, in step 315, the file mark counter value equals the target file mark value, in step 345, the formatter repositions the programmable pointer 226 back over the file mark codeword. The formatter 220 achieves this by subtracting the word length (i.e. 32) from its value. This has the automatic effect of setting the programmable pointer value to the start of the file mark codeword that has just been encountered. Further, in step 350, the file mark counter value is decremented by one. The combination of the preceding two steps has the effect of placing the current position 'after' the file mark, bearing in mind that the space was in the reverse direction, and correcting the act of having added 1 to the file mark target position earlier on in the process.

Finally, in step 355, the space operation ends, with an appropriate success message being sent to the host.

Figure 4:
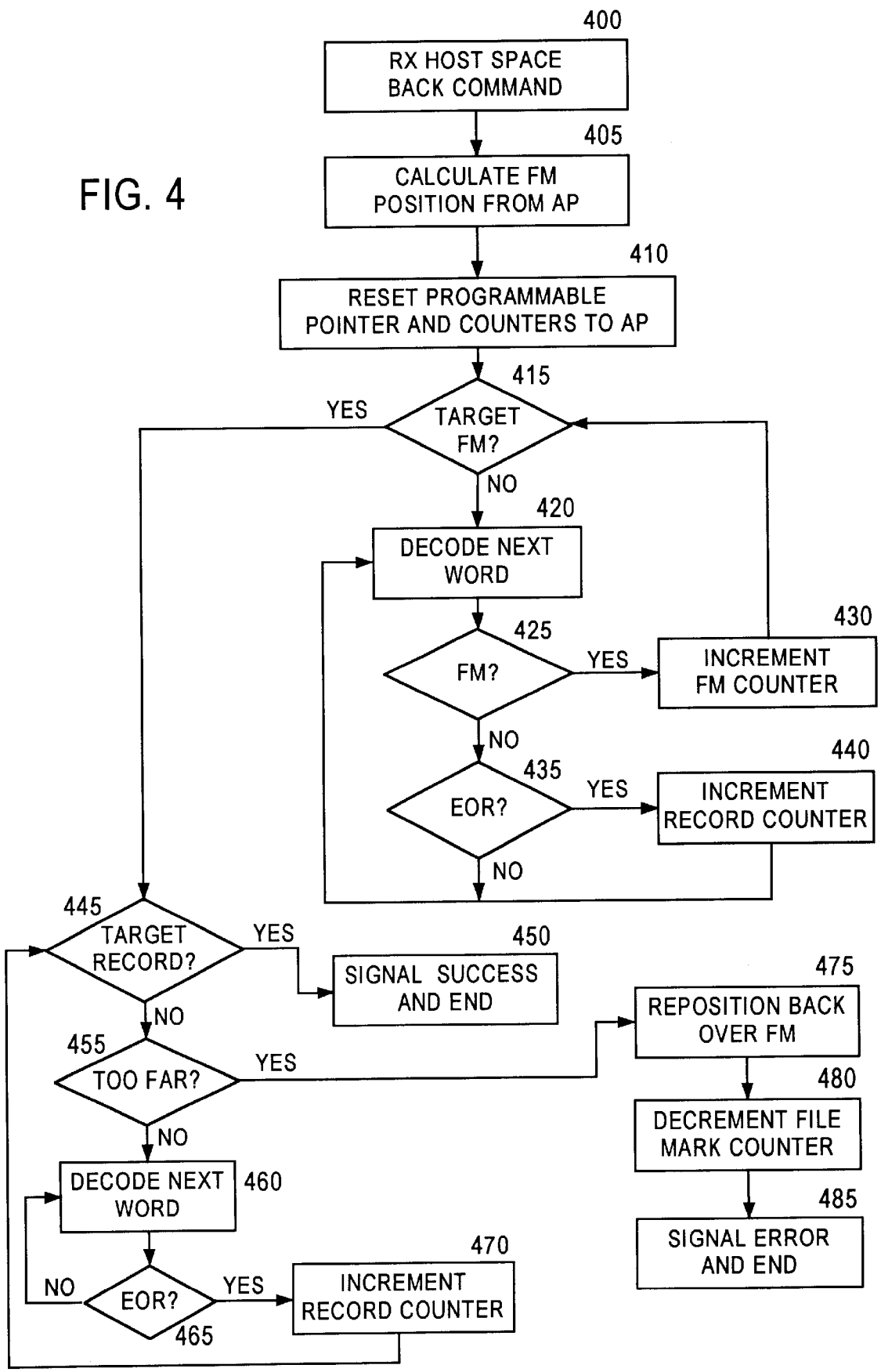
FIG. 4 is a flow diagram which illustrates an exemplary process for locating a target specified in terms of a number of records upstream of a current position in an encoded data stream.

FIG. 4 illustrates a process for moving backwards from a current position 7 (2F, 5R) by three records (i.e. to position 3), which instead leaves the new current position as position 5 (1F, 4R), since an 'unexpected' file mark (F2) is encountered.

In step 400, the tape drive 200 receives a host command to space backwards by three records. In step 405, calculates the target position as a number of file marks and records downstream of the access point, by subtracting the number of records to space back by (i.e. 3) from the value in the record counter 223 (i.e. 7) to determine the desired target record position (i.e. position 3) and, saving the current value of the file mark counter 221 (i.e. 2), which is the target file mark value.

In step 410, the formatter 220 sets the programmable pointer 226 and both the record and file mark counters to the respective values of the access point (again, in this example, the values will be zero).

In step 415, the formatter 220 determines whether the file mark counter 223 value at the access point equals the target file mark value. If it does not, in step 420, the formatter 220 decodes the first word (i.e. 32 bits in this example) in the main buffer 230 and updates the programmable pointer 226 accordingly. Then, in step 425, the formatter 220 determines whether the word is a file mark codeword, by reference to the lookup table 227. In step 430, if the word is a file mark codeword, the formatter 220 increments the file mark counter 223 and the process loops back to step 415 to test the file mark counter value against the target position again. Otherwise, in step 435, the formatter 220 determines whether the word is an end of record codeword. If not, the process loops back to step 420 to decode the next word. However, if the word is an end of record codeword, in step 440 the formatter increments the record counter 223 and then the process loops back to step 420 to decode the next word.

If, in step 415, the file mark counter value does equal the target file mark value, in step 445 the formatter 220 determines whether the record counter 221 value equals the target record value. If it does, the process ends in step 450, with an appropriate success message being sent to the host. Otherwise, in step 455, the formatter 220 determines whether the record counter 221 value exceeds the target record value.

If the record counter 221 does not equal the target record value, the formatter 220 decodes the next word in step 460. In step 465, if the word is not an end of record codeword, the process loops back to step 460 in order to decode the next word. Otherwise, in step 470, the formatter 220 increments the record counter 221 and then loops back to step 445 to compare the record counter value with the target record value again.

If, in step 455 the record counter value does exceed the target value, in step 475 the formatter repositions the programmable pointer 226 back over the file mark codeword. This is because the desired record is not achievable from the original position, as a result of encountering an 'unexpected' file mark, resulting in an error condition. The formatter 220 steps back over the file mark codeword by subtracting the word length (i.e. 32) from its value. This has the automatic effect of setting the programmable pointer value to the start of the file mark codeword that has just been encountered. Further, in step 480, the file mark counter value is decremented by one. The combination of the preceding two steps has the effect of placing the current position 'after' the file mark, bearing in mind that the space was in the reverse direction. Finally, in step 485, the process ends with an appropriate error message being sent to the host.

As described, there are times when it is necessary to backspace over a file mark once it has been encountered. Two occasions when this is necessary are: when a back space command is defined in terms of a number of file marks back from the current position; and when a back space command includes a number of records backward and an unexpected file mark is encountered.

Backspacing over a file mark can be achieved in a number of ways, depending on the tape drive architecture. In the above two examples, backspacing is achieved by resetting the programmable pointer 226 to the beginning of the file mark codeword. This can be achieved very conveniently since, in the present format, file mark codewords begin on 32-bit word boundaries in the encoded data stream. Thus, the programmable pointer 226 can simply be reset to the preceding 32-bit word boundary.

An alternative to actually backspacing over a file mark is by configuring the formatter 220 to load a file mark codeword back into the front of its decoding pipeline after t encounters a file mark codeword. Thus, as soon as decoding is resumed, the first data output is a 'file mark encountered' signal and the file mark counters are incremented whenever the decode is resumed. In this way, the value of the programmable pointer 226 need not be reset.

What is claimed is:

1. A method of controlling data storage apparatus to locate a target position upstream of a current position within an encoded data stream, the encoded data stream being readable only in the downstream direction from an access point and comprising a sequence of codewords including data codewords representing encoded blocks of user data and structure codewords representing the logical partitioning of the blocks of user data within the encoded data stream, wherein the target position is a number of structure codewords upstream from the current position and at, or a number of structure codewords downstream from, the access point, the method including the steps of:

from the current position, moving to the access point upstream of the target position;

from the access point, decoding the encoded data in the downstream direction until the structure codeword at the target position is encountered or until an unexpected structure codeword is encountered; and arranging the apparatus to re-encounter said structure codeword first in any subsequent data read operation.

2. A method according to claim 1, in which the structure codewords comprise file mark codewords interspersed with the blocks of user data in the encoded data stream.

3. A method according to claim 2, in which the current position is a known number CF of file mark codewords downstream from the access point and the target position is a number TF of file mark codewords upstream of the current position, comprising the steps of:

calculating the respective number of file mark codewords to move forwards by from the access point as CF−TF+1 to reach the target position;

decoding forwards from the access point and counting the number EF of file mark codewords encountered until the file mark codeword CF−TF+1 is encountered; and arranging the apparatus to re-encounter the file codeword CF−TF+1 first in any subsequent data read operation.

4. A method according to claim 1, in which there are at least two kinds of structure codeword including record boundary codewords and file mark codewords, wherein record boundary codewords indicate the position of record boundaries in the encoded data stream and the file mark codewords indicate the position of file marks, which are interspersed with the records in the encoded data stream.

5. A method according to claim 4, in which the current position is a known number CR of records and a known number CF of file marks downstream from the access point and the target position is a number TR of records upstream of the current position, comprising the steps of:

calculating the respective number of records codewords to move downstream by from the access point as CR−TR;

decoding downstream from the access point and counting the number ER of record boundary codewords encountered and the number ER of file mark codewords encountered until the file mark codeword CF is encountered; and if the number of encountered record boundary codewords ER is greater than the number CR−TR of required records from the access point, signalling an error condition that an unexpected file mark has been encountered in the upstream direction and arranging the apparatus to re-encounter said file mark codeword CF first in any subsequent data read operation, otherwise, decoding downstream from file mark codeword CF until the record TR is encountered.

6. A method according to claim 1, wherein the encoded data stream is stored in a memory of the apparatus and the current position in the encoded data stream is represented by a programmable pointer, which points to a respective memory location of the current position in the memory, and wherein the programmable pointer is updated as the encoded data stream is decoded.

7. A method according to claim 6, in which the encoded data stream is arranged as a series of fixed-length words which are the same length as, or longer than, the structure codewords, wherein each structure codeword is padded to the word boundary following the preceding codeword.

8. A method according to claim 7, wherein the apparatus is arranged to re-encounter a structure codeword by setting the programmable pointer to point to the preceding word boundary.

9. A method according to claim 1, wherein the apparatus is arranged to re-encounter a structure codeword by loading a decoder of the apparatus with respective structure codeword data, such that the structure codeword data is returned first in any subsequent read operation.

10. Data storage apparatus arranged to operate in accordance with claim 1.

11. Tape drive apparatus arranged to operate in accordance with claim 1.

12. Tape drive apparatus comprising:

an interface arranged to receive a host command to locate a target position within an encoded data stream;

a data store arranged to store at least some of the encoded data stream, the encoded data stream being readable only in a downstream direction from an access point which is upstream of the target position and comprising a sequence of codewords including data codewords representing encoded blocks of user data and structure codewords representing the logical partitioning of the blocks of user data within the encoded data stream; and a decoder arranged to locate the access point and decode the stored data in the main memory downstream from the access point until the target position is encountered or until an unexpected structure codeword is encountered, the decoder also being arranged to re-encounter said structure codeword first in any subsequent data read operation.

* * * * *